(12) United States Patent
McCord

(10) Patent No.: US 9,220,248 B2
(45) Date of Patent: Dec. 29, 2015

(54) APPARATUS FOR A FISHING REEL

(71) Applicant: William C. McCord, Towson, MD (US)

(72) Inventor: William C. McCord, Towson, MD (US)

( * ) Notice: Subject to any disclaimer, the term of this patent is extended or adjusted under 35 U.S.C. 154(b) by 63 days.

(21) Appl. No.: 14/095,975

(22) Filed: Dec. 3, 2013

(65) Prior Publication Data

US 2015/0150228 A1    Jun. 4, 2015

(51) Int. Cl.
*A01K 89/01* (2006.01)
*A01K 89/00* (2006.01)
*A01K 89/06* (2006.01)

(52) U.S. Cl.
CPC ........... *A01K 89/00* (2013.01); *A01K 89/01925* (2015.05); *A01K 89/06* (2013.01)

(58) Field of Classification Search
CPC .... A01K 89/06; A01K 89/016; A01K 89/033
USPC ......... 242/227, 229, 317, 310, 283, 290, 303, 242/304, 306, 316, 282
See application file for complete search history.

(56) References Cited

U.S. PATENT DOCUMENTS

| | | | |
|---|---|---|---|
| 2,083,689 A * | 6/1937 | Clifford | 242/229 |
| 2,581,306 A * | 1/1952 | Slotterback | 242/229 |
| 2,613,046 A * | 10/1952 | Redding | 242/229 |
| 2,633,307 A * | 3/1953 | Morgan et al. | 242/229 |
| 2,634,920 A * | 4/1953 | Dunn | 242/229 |
| 2,744,693 A | 5/1956 | Albert | |
| 3,033,485 A | 5/1962 | Shearer | |
| 3,226,052 A * | 12/1965 | King | 242/260 |
| 3,384,320 A * | 5/1968 | Hawk | 242/229 |
| 3,727,857 A | 4/1973 | Chann | |
| 3,817,470 A * | 6/1974 | Calhoun | 242/229 |
| 3,823,502 A * | 7/1974 | Countryman | 43/20 |
| 3,903,635 A * | 9/1975 | Boese | 242/229 |
| 3,944,159 A * | 3/1976 | Dobbs | 242/229 |
| 4,019,693 A * | 4/1977 | Lesage | 242/229 |
| 4,106,717 A * | 8/1978 | Thiel | 242/229 |
| 4,196,867 A | 4/1980 | Miller | |
| 4,213,579 A * | 7/1980 | Fox | 242/255 |
| 6,131,839 A * | 10/2000 | Kmetyko | 242/317 |
| 6,267,312 B1 | 7/2001 | Farris et al. | |
| 6,964,389 B2 | 11/2005 | Hill et al. | |
| 2003/0136867 A1 | 7/2003 | Kitajima | |
| 2004/0025403 A1* | 2/2004 | Barker | 43/20 |
| 2006/0237565 A1* | 10/2006 | Barker | 242/229 |
| 2010/0059615 A1* | 3/2010 | Lombardo et al. | 242/229 |
| 2012/0001007 A1* | 1/2012 | Bloemendaal | 242/229 |

* cited by examiner

*Primary Examiner* — Emmanuel M Marcelo
(74) *Attorney, Agent, or Firm* — Ariel S. Bentolila; Bay Area IP Group LLC

(57) ABSTRACT

An apparatus comprises a spool holder being configured for engaging a bottom side of a fishing pole. The spool holder comprises a rotatable member, and an axel portion on a distal end. The rotatable member enables the spool holder to rotate at least 180 degrees relative to the engaged fishing pole with the axel portion pivoting about an axis normal to a longitudinal axis of the engaged fishing pole. A spool portion is configured for suspension by the spool holder on the axel portion for rotation about the axel portion and is configured for spooling a quantity of fishing line about an axis of the rotation on the axel portion. The spool portion comprises a generally symmetrical shape enabling the spool portion to be reversibly suspended on the axel portion.

18 Claims, 5 Drawing Sheets

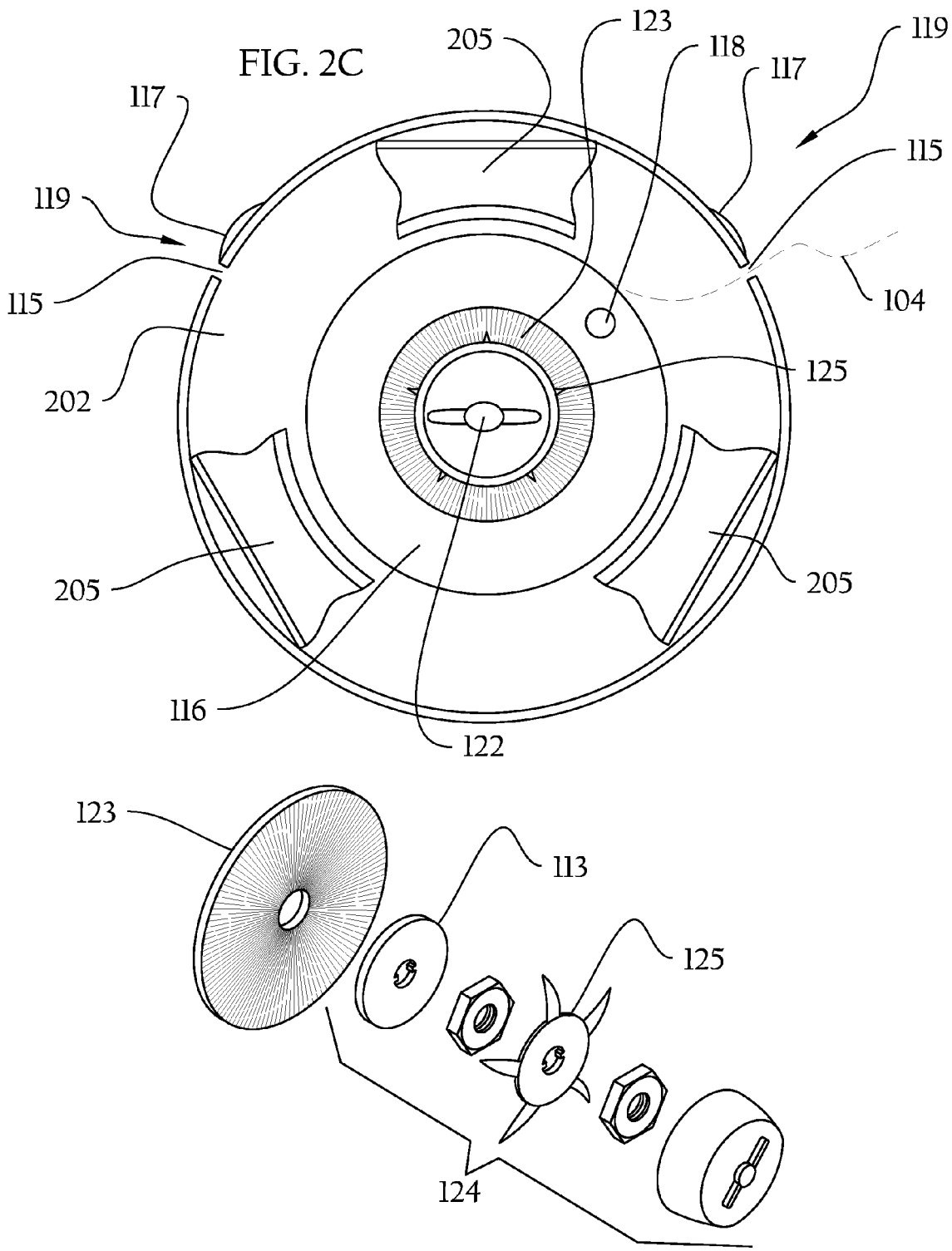

APPARATUS FOR A FISHING REEL

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to rotary devices. More particularly, the invention relates to rotary devices that serve as rotatable and reusable fishing reels.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that fishing is the activity of trying to catch fish. Fish are normally caught in the wild. Techniques for catching fish include hand gathering, spearing, netting, angling and trapping. A fishing rod and reel may be utilized for this function.

Typically, a fishing reel is a cylindrical device attached to a fishing rod used in winding and stowing line. Fishing reels may include fittings that help in casting for distance and accuracy, as well as retrieving line. Fishing reels are traditionally used in the recreational sport of angling and competitive casting. They are typically attached to a fishing rod.

Typically, direct-drive reels have the spool and handle directly coupled. When the handle moves forwards, the spool moves forwards, and vice-versa. With a fast-running fish, this may have consequences for the angler's knuckles.

Often, drag systems are a mechanical means of applying variable pressure to the line spool or drive mechanism in order to act as a friction brake against it. This supplies resistance to the line after hook-up to aid in landing the fish without the line breaking Proper drag setting depends on fishing conditions, line test, break strength, and the size and type of fish being targeted. Often it's a matter of feel and knowing the setup to configure the proper drag setting.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A, 2B, and 2C illustrate exemplary spool portions, in accordance with an embodiment of the present invention;

Figure 1A:
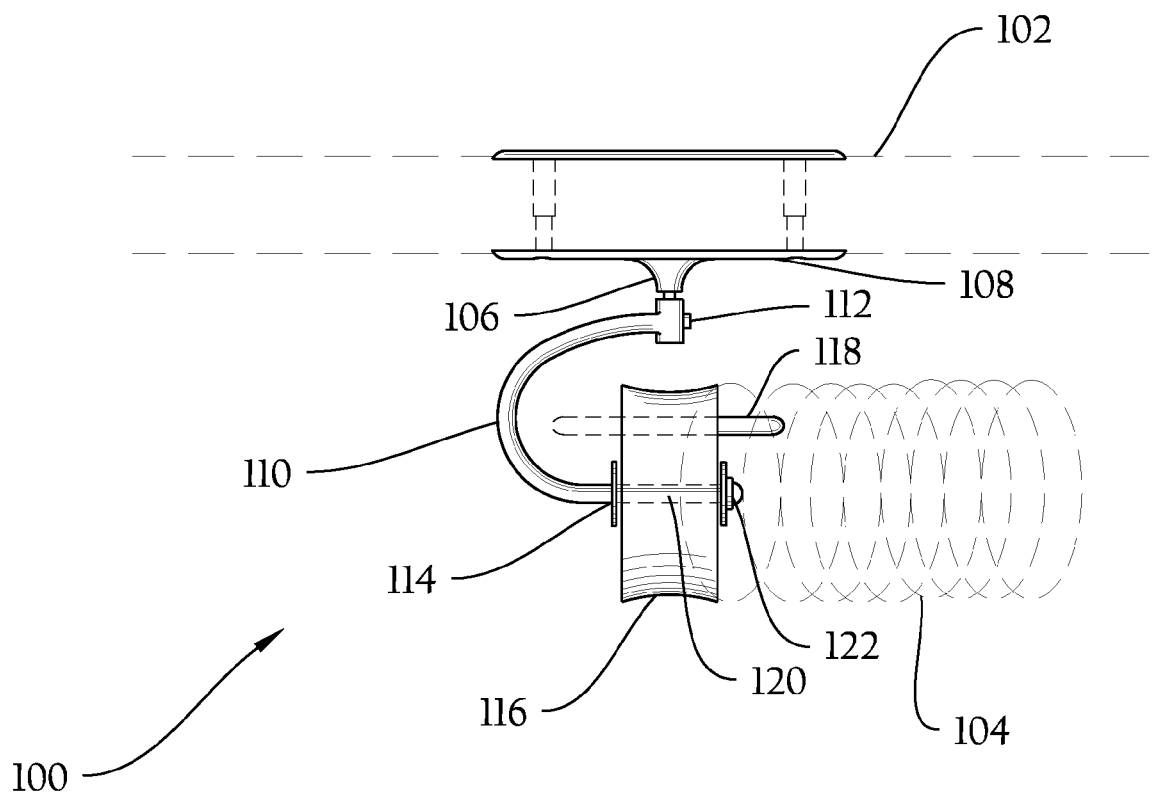
FIGS. 1A and 1B illustrate side views of an exemplary rotary device joined with an exemplary rod, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures.

Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The Applicants hereby give notice that new Claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

There are various types of rotary devices that may be provided by preferred embodiments of the present invention. In one embodiment of the present invention, the rotary device may join with an eclectic and interchangeable assortment of rods, while pivoting approximately 180 degrees about a first axis that lies perpendicular to the rod. The 180 degree pivoting motion of the rotary device may allow a line that wraps around a spool portion of the rotary device to wind up or cast out from a plurality of angles and orientations. For example, without limitation, if the rotary device is utilized as a fishing spool, the line may be cast by either a left hand or a right hand. It pivots along a slot, so as to position it at any angle along a proximate 180 degree arc. A spool axis is supported from either end by retainers, rather than a housing. The retainers help provide drag to the rotation of the spool portion. In some embodiments the spool is generally symmetrical and may be flipped about its axis of rotation and wound in either direction. Further, the rotary device may provide the functionality of both a spinning reel and a casting reel due to a unique configuration and position relative to the rod. For example, without limitation, the rotary device may cast out the line similarly to a spinning reel because of the positioning beneath the rod, which minimizes effort by the wrist. The absence of a rotating spool, like the spinning reel, also helps inhibit overruning and fouling the line. Likewise, similar to a casting reel, the rotary device may include a clicking mechanism that indicates when tension appears on the line, and helps keep the line from overruning. In this manner, the advantages of both the spinning reel and the casting reel may be utilized. Since the spool may be oriented to be like a spinning or spincast reel, or a casting, trolling or fly reel, and the spool may be made to turn freely, the rotary device may be used for fishing in a highly variable manner.

In one embodiment of the present invention, the rotary device may include a light weight spool portion that joins to an extreme end of the rod through a rod fastener. The rod fastener may be configured to contour to the shape of an eclectic assortment of rods. In some embodiments, the rod fastener may form a pair of semi-circular clamps that press around an extreme end of the rod, securing through a fastener. In another embodiment, the rod fastener may join the spool portion at an extreme end of the rod, whereby the end of the rod and the spool portion may be configured to be operable by a hand. The rod fastener may secure the spool portion beneath the rod, relative to a user holding the rod parallel to a ground surface. In this manner, the rod and the line may be manipulated more efficiently.

In one embodiment of the present invention, the rod fastener may include a T-shaped rod attachment that joins with the rod through fasteners. The rod may include, without limitation, a cane rod, a bamboo rod, a fiberglass rod, and a wooden rod. Those skilled in the art, in light of the present teachings, will recognize that the interchangeable functionality of the rotary device may be efficacious for providing inexpensive fishing spool capabilities, in conformance with cheaper bamboo and cane fishing rods. In some embodiments, the rod attachment may extend down from the rod at a first axis that is perpendicular to the rod, and join with a spool holder. The spool holder may form a U-shape configured to carry the spool portion. The spool holder may be configured to provide sufficient space for unrestricted rotation by the spool portion. The spool holder may include a lock end that joins with the rod attachment. The lock end may include a plurality of apertures that join with the rod attachment. Each aperature allows the spool holder to pivot to a unique position, with a total pivoting range of up to 180 degrees. For example, without limitation, each aperture may lock the spool holder in a casting position, a left handed wind up position, and a right handed wind up position. The pivoting motion of the spool portion may also provide additional angles and orientations for manipulating the line in tight areas. In some embodiments, the spool holder may include a retainer end. The retainer end may pass through the spool portion, providing support for the extreme edges of a spool axis. The spool axis may be supported from either end by a pair of retainers, which also serve to provide adjustable drag to the line. In this manner, the spool portion is not supported by a housing, and revolves independently of the housing.

In one embodiment of the present invention, the spool portion rests substantially inside a stationary housing. The housing may provide a protective casing to protect the line from the elements while the line is being wound onto the spool portion. Those skilled in the art, in light of the present teachings, will recognize that the spool may require revolving within the housing such that the spool portion is flush with the housing. In this manner, the line may be at least partially prohibited from tangling behind the spool portion. The housing may serve various functions, including, without limitation, providing gate openings and gate slides (so the line can be cast) and line openings (so the line can be retrieved), storing the line, and keeping the line from slipping off the back of the spool axis. In some embodiments, a line fastener may press the line against the spool axis to maintain the line on the spool portion. The line fastener may also serve to release the line from the spool portion to wind or cast the line.

In one embodiment of the present invention, the spool portion may include a clicker portion for indicating tension on the line and helping prevent overruning by the line. The clicker portion may include gears and a lock that engage to form a clicking sound. The gears may engage an exterior area of the spool portion. The spool portion may further include a drag assembly for providing friction between the spool axis and the line. The friction may help reduce the speed by which the line is grabbed from the rotary device. The drag assembly may be configured to be operable to be regulated by a thumb. In one embodiment, a pair of wing nuts may rotatably engage the drag assembly to regulate the amount of friction applied to the line. In some embodiments, a handle portion may join with the spool portion. The handle portion may be configured to be operable to be gripped by a hand for operation of the rotary device and the rod.

Figure 1B:
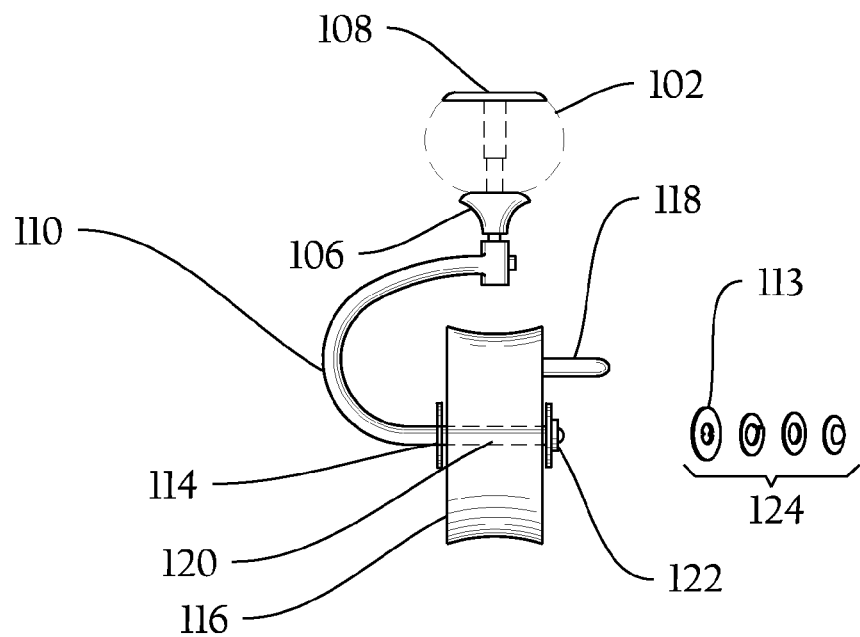

FIGS. 1A and 1B illustrate side views of an exemplary rotary device joined with an exemplary rod, in accordance with an embodiment of the present invention. In one embodiment of the present invention, a rotary device 100 may join with an eclectic and interchangeable assortment of rods 102. In non-limiting examples, it may be used to fly a kite, as a spearfishing reel, or to stow, let out, and retrieve a wide variety of materials including tubing, wire, and line. It may be used to put twists in such material as ribbon. It may be used in combination with a device that would reverse line twist as material was taken off the spool. The interchangeable feature of the rotary device may provide efficient and cost effective solutions for winding up and casting out a line. In some embodiments, the rotary device may be configured to pivot approximately 180 degrees about a first axis that lies perpendicular to the rod. However, in other embodiments, the pivot may be greater or less, depending on the required function. In some embodiments, the approximately 180 degree pivoting motion of the rotary device may allow a line 104 that wraps around a spool portion of the rotary device to wind up or cast out from a plurality of angles and orientations. For example, without limitation, if the rotary device is utilized as a fishing spool, the line may be cast by either a left hand or a right hand. Further, the rotary device may provide the functionality of both a spinning reel and a casting reel due to a unique configuration and position relative to the rod. For example, without limitation, the rotary device may cast out the line similarly to a spinning reel because of the positioning beneath the rod, which minimizes effort by the wrist. The absence of a rotating spool, like the spinning reel, also helps inhibit overruning and fouling the line. Likewise, similar to a casting reel, the rotary device may include a clicking mechanism that indicates when tension appears on the line, and helps keep the line from overruning. In this manner, the advantages of both the spinning reel and the casting reel may be utilized.

In one embodiment of the present invention, the rotary device may include a light weight spool portion 116 that joins to an extreme end of the rod through a rod fastener 106. The rod fastener may be configured to contour to the shape of an eclectic assortment of rods, including, without limitation, a cane rod, a bamboo rod, a wooden rod, an aluminum rod, and a fiberglass rod. In some embodiments, the rod fastener may form a pair of semi-circular clamps that press around an extreme end of the rod, securing through a fastener. However, in other embodiments, the rod may join with the spool portion through other mechanisms, including, without limitation, magnets, bolts, adhesives, rope, and welding. In another embodiment, the rod fastener may join the spool portion at an extreme end of the rod, whereby the end of the rod and the spool portion may be configured to be operable by a hand. The rod fastener may secure the spool portion beneath the rod, relative to a user holding the rod parallel to a ground surface. In this manner, the rod and the line may be manipulated more efficiently. Those skilled in the art, in light of the present teachings, will recognize that the interchangeable functionality of the rotary device may be efficacious for providing inexpensive fishing spool capabilities, in conformance with cheaper bamboo and cane fishing rods.

In one embodiment of the present invention, the rod fastener may include a T-shaped rod attachment 108 that joins with the rod through fasteners. The rod atachment may include two portions that form a clam shape, joining around the rod. In some embodiments, the rod attachment may extend down from the rod at a first axis that is perpendicular to the rod, and join with a spool holder 110. The spool holder may form a U-shape configured to carry the spool portion. The spool holder may be configured to provide sufficient space for unrestricted rotation by the spool portion. In some embodiments, the axle end of the spool holder is slotted, so a retainer may be fashioned to fit into the slot to keep it from rotating along with the spool. In some embodiments, the spool holder may include a lock end 112 that joins with the rod attachment. The lock end may include a plurality of apertures that join with the rod attachment. Each aperature allows the spool holder to pivot to a unique position, with a total pivoting range of up to approximately 180 degrees. The lock end may include a lock button that forms a part of a swivel unit. Depressing the lock button may allow movement to a different configuration. For example, without limitation, each aperture may lock the spool holder in a casting position, a left handed wind up position, and a right handed wind up position. The pivoting motion of the spool portion may also provide additional angles and orientations for manipulating the line in tight areas.

In one embodiment of the present invention, the spool holder may include a fixed retainer end 114. The retainer end may pass through the spool portion, providing support for the extreme edges of a spool axis 120. The spool axis may be supported from either end by a pair of retainers, fixed retainer 114 and removable retainer 113, which also serve to provide adjustable drag to the line. In this manner, the spool portion is not supported by a housing, and revolves independently of the housing. In some embodiments of the present invention it may not be necessary for the spool to have a housing. The rotary device may be made in a very simple form, with a minimum of parts, without sacrificing function. The spool may easily rotate to cast and retrieve without the encumbrance of a housing. The spool portion may further include a drag assembly 122 for providing friction between the spool axis and the line. The friction may help reduce the speed by which the line is grabbed from the rotary device. The drag assembly may be configured to be operable to be regulated by a thumb. In one embodiment, a plurality of fasteners 124 may rotatably engage the drag assembly to regulate the amount of friction applied to the line. The plurality of fasteners may include, without limitation, a pair of wing nuts, washers, and a lock nut. Those skilled in the art, in light of the present teachings, will recognize that the friction generated by the drag assembly may be produced from a plurality of discs arranged in a stack on the spool axis. A screw or lever mechanism may press against the discs, whereby the higher the pressure, the greater the resistance against the line. In some embodiments, the removable retainer is positioned to always permit the spool to rotate freely. It slides down a slot in the axle end of the spool holder and stops to allow sufficient clearance for the spool to turn unimpeded. In other embodiments, the removable retainer comes down the slot until it contacts the spool. It may be pressed against the spool to increase rotational drag. In some embodiments, a handle portion 118 may join with the spool portion. The handle portion may be configured to be operable to be gripped by a hand for operation of the rotary device and the rod. In some embodiments, handle portion 118 is operable to slide through or be detachable from the spool portion so that the handle may be used from either side of the spool portion.

Figure 2A:
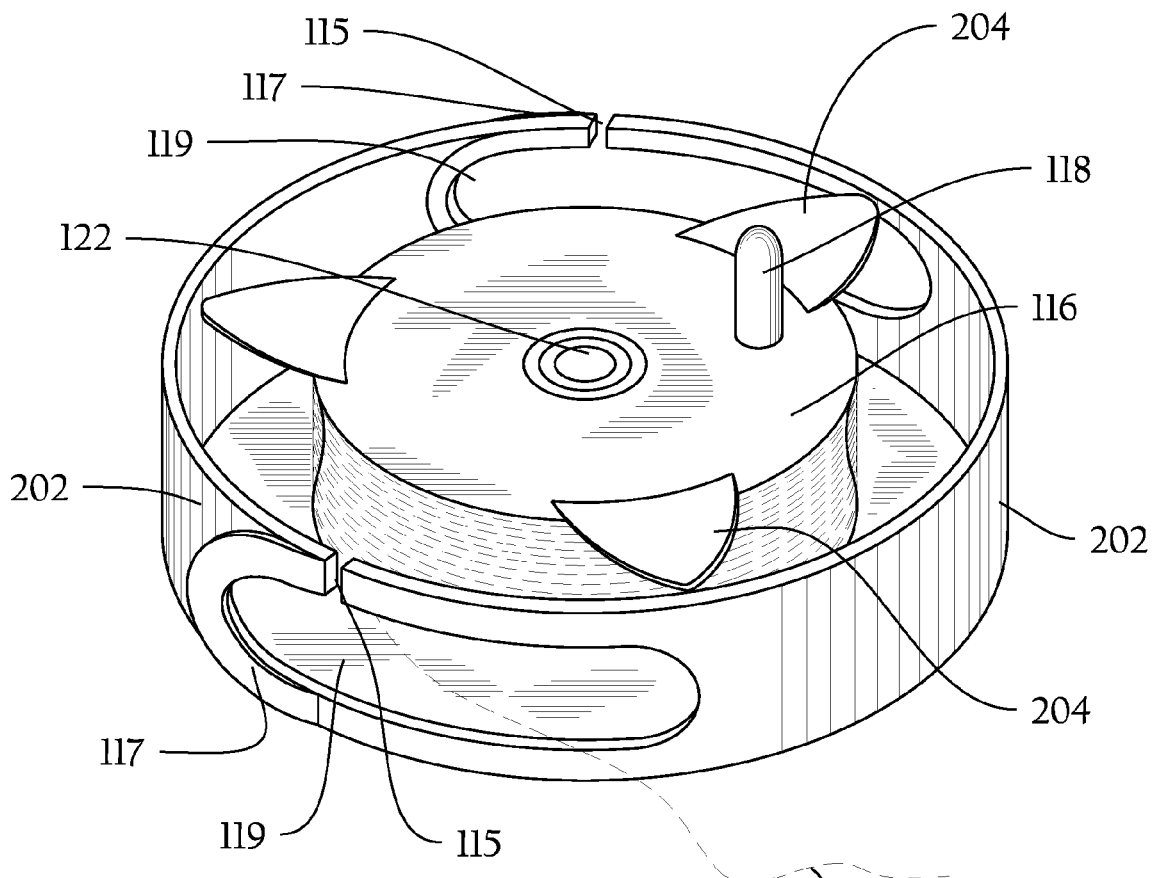
Figure 2B:
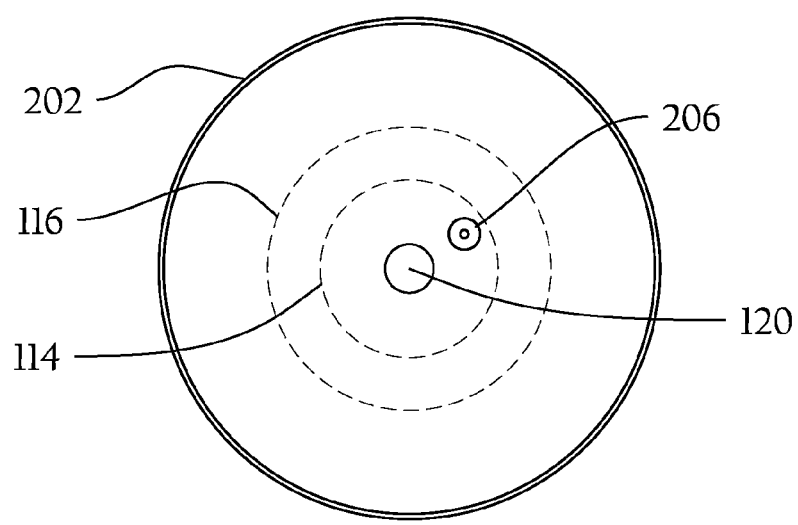

FIGS. 2A, 2B, and 2C illustrate exemplary spool portions, in accordance with an embodiment of the present invention. In an embodiment of the present invention, the spool portion rests substantially inside a stationary housing 202. The housing may provide a protective casing to protect the line from the elements while the line is being wound onto the spool portion. Those skilled in the art, in light of the present teachings, will recognize that the spool may require revolving within the housing such that the spool portion is flush with the housing. In this manner, the line may be at least partially prohibited from tangling behind the spool portion. The housing may serve various functions, including, without limitation providing line openings 119 for retrieving, and gate openings 115 and gate slides 117 for casting, storing the line, and keeping the line from slipping off the back of the spool axis. In yet another embodiment, the spool portion may include a cylindrical core so the line may wind evenly on the spool axis. The spool portion may further include a lip to help prevent the line from spilling off of the spool axis.

In one embodiment of the present invention, a line fastener 204 may press the line against the spool axis to maintain the line on the spool portion. The line fastener may also serve to release the line from the spool portion to wind or cast the line. In some embodiments, the line fastener may comprise wires or paddles attached to the spool which folded forward or retracted allow casting. In some embodiments, the line fastener may comprise wires, doors, or paddles attached to the housing that may be folded away from the center of the spool or slid away to permit casting. In some embodiments, the line fasteners that are attached to the spool may be made so they may be detached from one side of the spool and reattached to the other side. In some embodiments, the spool portion may include a clicker portion 206 for indicating tension on the line and helping prevent overrunning by the line. The clicker portion may include gears and a lock that engage to form a clicking sound. The gears may engage an exterior area of the spool portion.

In one embodiment of the present invention, the housing has line openings 119 to permit line to be wound through the housing onto the spool using either hand. Each line opening 119 has a gate 115 so that line may be taken through it for casting. The gate slides 117 wrap around each side of the gate opening 115 when they are closed to structurally reinforce it. Referring to FIG. 2C, hinged line fasteners 205 are attached to the housing and fold up, away from the spool, when casting. In some embodiments, the line fasteners may be fashioned so the end of the line with the hook on it may be neatly stowed when not in use. The spool is designed so that the curved contours allow the line to flow easily off of it. In some embodiments, the front surface for spool 116 has a circular metal inset 123 with radial ridges of varying heights arranged in a repetitive sequence. Drag assembly 124 has a starfish shaped flexible metal washer 125 which can be tightened down by the end cap to apply varying amounts resistance to spool rotation. The rear surface of the spool has a circular metal inset where it makes contact with the fixed retainer and the hole going through the spool has cylindrical metal inset. The axle end of spool holder 110 is slotted in such a manner that removable retainers cannot rotate and they permit the spool to turn freely when drag is not being applied In some embodiments, the spool is reversible, and has a handle 118 which may pushed through it or is detachable so it may be used on either side.

Figure 2D:
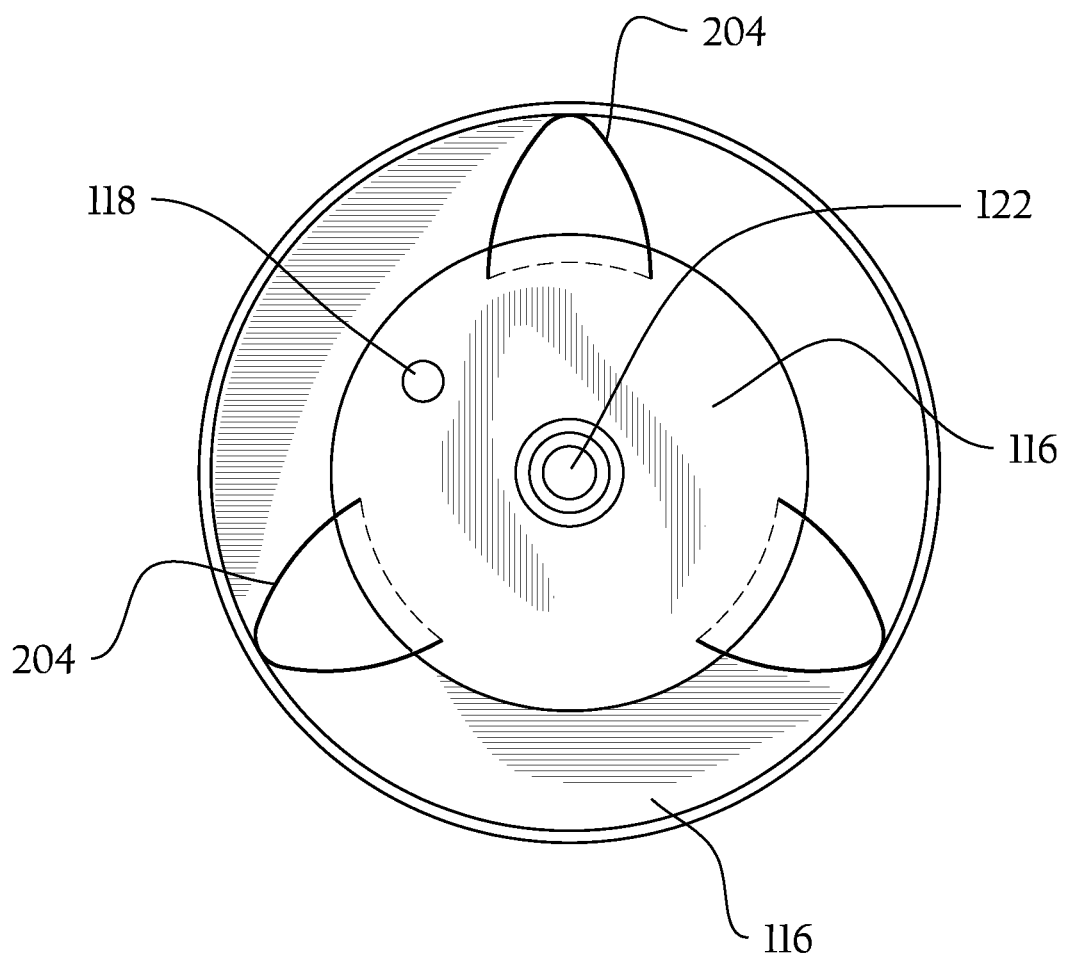
FIG. 2D illustrates an exemplary spool portion, in accordance with an embodiment of the present invention.

FIG. 2D illustrates an exemplary spool portion, in accordance with an embodiment of the present invention. In an embodiment of the present invention, the spool is asymmetrical, with the back wall of the spool being greater in circumference than the front surface of the spool. Wire line fasteners 204 help keep the line on the spool. The fasteners 204 may be folded forward to allow removal of line from the spool.

Figure 3A:
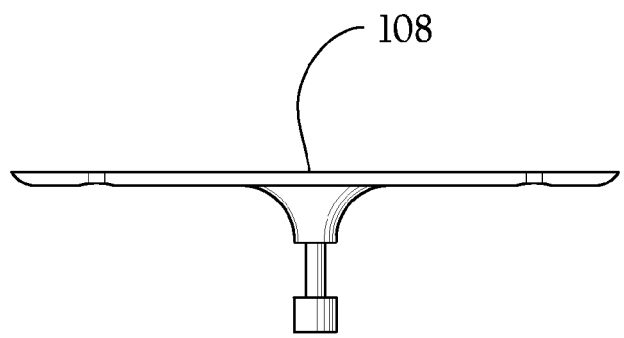
FIGS. 3A, 3B, and 3C illustrate exemplary rod fasteners, in accordance with an embodiment of the present invention.
Figure 3B:
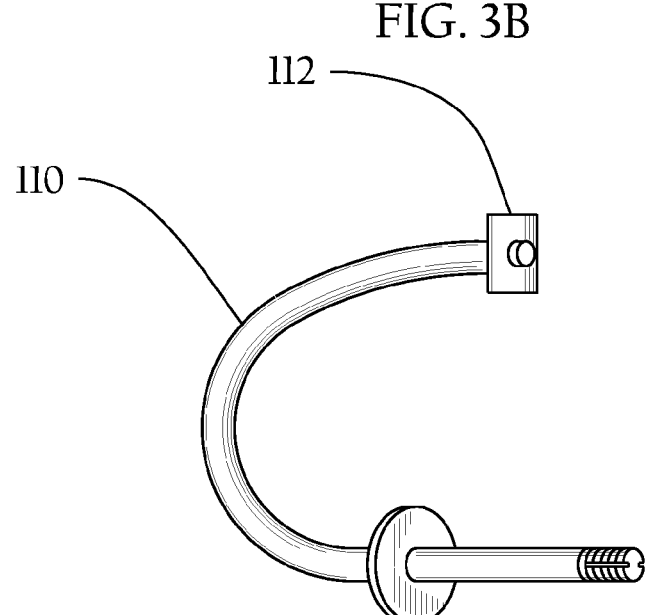
Figure 3C:
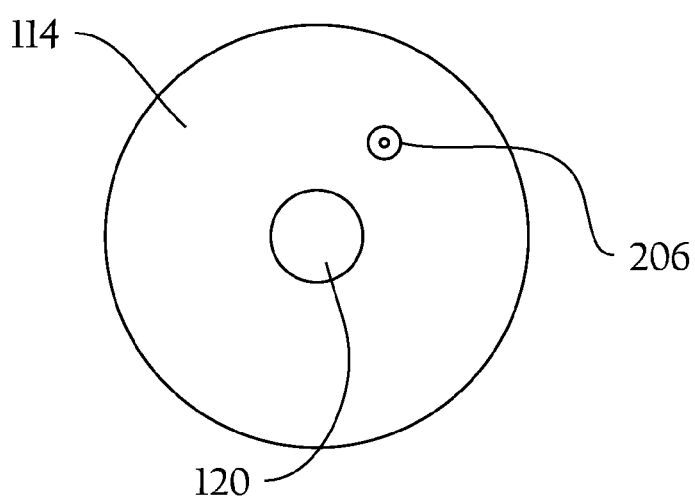

FIGS. 3A, 3B, and 3C illustrate exemplary rod fasteners, in accordance with an embodiment of the present invention. In some embodiments of the present invention, the rod fastener may include a T-shaped rod attachment that joins with the rod through fasteners. The rod may include, without limitation, a cane rod, a bamboo rod, a fiberglass rod, and a wooden rod. Those skilled in the art, in light of the present teachings, will recognize that the interchangeable functionality of the rotary device may be efficacious for providing inexpensive fishing spool capabilities, in conformance with cheaper bamboo and cane fishing rods. In some embodiments, the rod attachment may extend down from the rod at a first axis that is perpendicular to the rod, and join with a spool holder. The spool holder may form a U-shape configured to carry the spool portion. The spool holder may be configured to provide sufficient space for unrestricted rotation by the spool portion. The spool holder may include a lock end that joins with the rod attachment. The lock end may include a plurality of apertures that join with the rod attachment. Each aperature allows the spool holder to pivot to a unique position, with a total pivoting range of up to approximately 180 degrees. For example, without limitation, each aperture may lock the spool holder in a casting position, a left handed wind up position, and a right handed wind up position. The pivoting motion of the spool portion may also provide additional angles and orientations for manipulating the line in tight areas. In some embodiments, the spool holder may include a retainer end. The retainer end may pass through the spool portion, providing support for the extreme edges of a spool axis. The spool axis may be supported from either end by a pair of retainers, which can be configured to allow the spool to turn freely or provide adjustable drag to the line. In this manner, the spool portion is not supported by a housing, and revolves independently of the housing.

In one alternative embodiment, the rotary device may be operated by stripping the line off the reel with one hand, while casting the rod with the other hand. In this manner, smooth uninterrupted tension occurs when tension is applied to the end of the line, and a thumb may counterbalance the weight of the rod when casting. In yet another alternative embodiment, the spool portion comprises an anti-reverse reel that allows a line to pay out while the handle remains stationary. In yet another alternative embodiment, the handle may be manufactured separately from the spool portion, as an accessory.

In another alternative embodiment, the housing has its own axle. Therefore the spool does not have the spool holder as its axis of rotation. The housing with its axle is joined to the spool holder. In one embodiment, the housing is fastened without a spool holder to the top of the top of the rod in such a fashion that it pivots approximately 180 degrees. In another embodiment, the housing is secured in the same manner but is located beneath the rod. In some embodiments, the spool may be made to turn about the axle on ball bearings. In some embodiments, the housing may be made to have a screw-on or hinged cover, which may be opened to permit casting.

In yet another alternative embodiment, the rod fastener may be held on the rod handle with various circular clamps, be taped, screwed or nailed on, or fastened using a tubular stretch material. In other alternative embodiments, the reel handle may be attached to a retainer, or the spool may be made so that it might be turned with a handle secured to its axis of rotation. In other alternative embodiments, different drag mechanisms may be fashioned for different reel handle concepts. Components of the rotary device may be made of, but not limited to, metal, plastic, or composite materials, and the materials may be recyclable. In other alternative embodiments, the rotary device may be luminescent or emit light, and come equipped with measuring, metering, or electronic devices. The rotary device may be made to be any size, and utilize different proportional relationships in its makeup.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing a rotary device that joins with a variety of rods, and pivots 180 degrees to a perpendicular axis of the rod according to the present invention will be apparent to those skilled in the art. Various aspects of the invention have been described above by way of illustration, and the specific embodiments disclosed are not intended to limit the invention to the particular forms disclosed. The particular implementation of the rotary device that joins with a variety of rods, and pivots approximately 180 degrees to a generally perpendicular axis of the rod may vary depending upon the particular context or application. By way of example, and not limitation, the rotary device that joins with a variety of rods, and pivots approximately 180 degrees to a generally perpendicular axis of the rod described in the foregoing were principally directed to an interchangeable fishing reel that pivots approximately 180 degrees and can cast line from either hand beneath the rod implementations; however, similar techniques may instead be applied to situations where a line has to be cast in tight areas, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
    a spool holder being configured for engaging a bottom side of a fishing pole, said spool holder comprising a rotatable member, and an axle portion on a distal end, said rotatable member enabling said spool holder to rotate at least 180 degrees relative to the engaged fishing pole with said axle portion pivoting about an axis normal to a longitudinal axis of the engaged fishing pole; and a spool portion being configured for suspension by said spool holder on said axle portion for rotation about said axle portion and being configured for spooling a quantity of fishing line about an axis of the rotation on said axle portion, said spool portion comprising a generally symmetrical shape enabling said spool portion to be reversibly suspended on said axle portion.

2. The apparatus as recited in claim 1, further comprising a locking mechanism being configured for locking said rotatable member at a selected position.

3. The apparatus as recited in claim 1, further comprising at least one retainer configured at least to be operable for restricting longitudinal movement of said spool portion on said axle portion in which retainer is further at least configured to either adjustably control an amount of drag on the spool rotation about said axle portion or allow the spool to rotate freely if no substantial drag is experienced thereby.

4. The apparatus as recited in claim 1, further comprising a spool handle for rotating said spool portion to retrieve the fishing line.

5. The apparatus as recited in claim 4, in which said spool handle is further configured to pass through sides of said spool portion and to be selectively accessible on either side of said spool portion.

6. The apparatus as recited in claim 1, further comprising a T-shaped rod attachment for joining said spool holder to the fishing pole.

7. The apparatus as recited in claim 1, further comprising a housing being fixedly engaged with said spool holder and configured to at least enclose a portion of said spool portion.

8. The apparatus as recited in claim 7, in which said housing further comprises at least two line openings, said line openings each comprising a gate opening for passing the fishing line into a selected opening.

9. The apparatus as recited in claim 1, further comprising a plurality of line fasteners being configured to maintain the fishing line on said spool portion and to be movable to enable casting of the fishing line off of said spool portion.

10. The apparatus as recited in claim 1, in which said spool holder further comprises a U-shape to position said axle portion.

11. The apparatus as recited in claim 1, in which the apparatus is further configured to produce a clicking sound for indicating tension on the fishing line.

12. An apparatus comprising:
a spool being configured for suspension by an axle portion of a spool holder for rotation on the axle portion, the spool holder being configured for engaging a bottom side of a fishing pole, the spool holder being further configured to rotate at least 180 degrees relative to the engaged fishing pole with the axle portion pivoting about an axis normal to a longitudinal axis of the engaged fishing pole, said spool being further configured for spooling a quantity of fishing line about an axis of the rotation on the axle portion, said spool comprising a generally symmetrical shape enabling said spool to be reversibly suspended on the axle portion.

13. The apparatus as recited in claim 12, in which a side of said spool has a larger diameter than an opposing side.

14. The apparatus as recited in claim 12, further comprising a plurality of line fasteners being configured to maintain the fishing line on said spool and to be movable to enable casting of the fishing line off of said spool.

15. The apparatus as recited in claim 14, in which said line fasteners comprise wires.

16. An apparatus comprising:
a spool holder being configured for engaging a bottom side of a fishing pole, said spool holder comprising a rotatable member, an axle portion on a distal end, and a U-shape to position said axle portion, said rotatable member enabling said spool holder to rotate at least 180 degrees relative to the engaged fishing pole with said axle portion pivoting about an axis normal to a longitudinal axis of the engaged fishing pole;
a T-shaped rod attachment for joining said spool holder to the fishing pole;
a locking mechanism being configured for locking said rotatable member at a selected position;
a spool portion being configured for suspension by said spool holder on said axle portion for rotation about said axle portion and being configured for spooling a quantity of fishing line about an axis of the rotation on said axle portion, said spool portion comprising a generally symmetrical shape enabling said spool portion to be reversibly suspended on said axle portion;
a plurality of line fasteners being configured to maintain the fishing line on said spool portion and to be movable to enable casting of the fishing line off of said spool portion;
at least one retainer configured at least to be operable for restricting longitudinal movement of said spool portion on said axle portion in which retainer is further at least configured to either adjustably control an amount of drag on the spool rotation about said axle portion or allow the spool to rotate freely if no substantial drag is experienced thereby; and
a spool handle for rotating said spool portion to retrieve the fishing line, in which said spool handle is further configured to pass through sides of said spool portion and to be selectively accessible on either side of said spool portion.

17. The apparatus as recited in claim 16, further comprising a housing being fixedly engaged with said spool holder and configured to at least enclose a portion of said spool portion.

18. The apparatus as recited in claim 17, in which said housing further comprises at least two line openings, said line openings each comprising a gate opening for passing the fishing line into a selected opening.

* * * * *